US011409753B2

(12) United States Patent
Boles et al.

(10) Patent No.: US 11,409,753 B2
(45) Date of Patent: *Aug. 9, 2022

(54) REDUCING PROBABILISTIC FILTER QUERY LATENCY

(71) Applicant: Micron Technology, Inc., Boise, ID (US)

(72) Inventors: David Boles, Austin, TX (US); John M. Groves, Austin, TX (US); Steven Moyer, Round Rock, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/749,523

(22) Filed: Jan. 22, 2020

(65) Prior Publication Data

US 2020/0159727 A1    May 21, 2020

Related U.S. Application Data

(63) Continuation of application No. 15/691,998, filed on Aug. 31, 2017.

(51) Int. Cl.
*G06F 16/2458* (2019.01)
*G06F 16/2455* (2019.01)
*G06F 16/901* (2019.01)

(52) U.S. Cl.
CPC ...... *G06F 16/2462* (2019.01); *G06F 16/2455* (2019.01); *G06F 16/9014* (2019.01); *G06F 16/9027* (2019.01)

(58) Field of Classification Search
CPC ............. G06F 16/2462; G06F 16/2455; G06F 16/9014; G06F 16/9027; G06F 16/9017
See application file for complete search history.

(56) References Cited

U.S. PATENT DOCUMENTS

| 6,262,943 B1 | 7/2001 | Clarke |
| 7,065,619 B1 | 6/2006 | Zhu et al. |

(Continued)

FOREIGN PATENT DOCUMENTS

| CN | 1328671 | 12/2001 |
| CN | 1545254 | 11/2004 |

(Continued)

OTHER PUBLICATIONS

"International Application Serial No. PCT US2018 045602, International Preliminary Report on Patentability dated Mar. 12, 2020", 7 pgs.

(Continued)

*Primary Examiner* — Amanda L Willis
(74) *Attorney, Agent, or Firm* — Schwegman Lundberg & Woessner, P.A.

(57) ABSTRACT

Systems and techniques for reducing probabilistic filter query latency are described herein. A query for a probabilistic filter that is stored on a first media may be received from a caller. In response to receiving the query, cached segments of the probabilistic filter stored on a second media may be obtained. Here, the probabilistic filter provides a set membership determination that is conclusive in a determination that an element is not in a set. The query may be executed on the cached segments resulting in a partial query result. Retrieval of remaining data of the probabilistic filter from the first media to the second media may be initiated without intervention from the caller. Here, the remaining data corresponds to the query and data that is not in the cached segment. The partial query results may then be returned to the caller.

20 Claims, 6 Drawing Sheets

(56) References Cited

U.S. PATENT DOCUMENTS

| | | | |
|---|---|---|---|
| 8,290,972 | B1 | 10/2012 | Deshmukh et al. |
| 9,015,269 | B2 | 4/2015 | Ruellan et al. |
| 10,579,633 | B2 | 3/2020 | Boles et al. |
| 2007/0156842 | A1 | 7/2007 | Vermeulen et al. |
| 2008/0222087 | A1 | 9/2008 | Balmin et al. |
| 2010/0106537 | A1 | 4/2010 | Yuasa et al. |
| 2011/0202725 | A1 | 8/2011 | Rose et al. |
| 2012/0059603 | A1 | 3/2012 | Stering |
| 2012/0072656 | A1 | 3/2012 | Archak et al. |
| 2012/0317381 | A1 | 12/2012 | Zhu et al. |
| 2013/0031229 | A1 | 1/2013 | Shiga et al. |
| 2013/0132408 | A1 | 5/2013 | Little |
| 2014/0244779 | A1 | 8/2014 | Roitshtein et al. |
| 2014/0289467 | A1 | 9/2014 | Svendsen et al. |
| 2014/0379615 | A1 | 12/2014 | Brigham et al. |
| 2014/0380285 | A1 | 12/2014 | Gabel et al. |
| 2014/0380286 | A1 | 12/2014 | Gabel et al. |
| 2016/0100943 | A1 | 4/2016 | Liu et al. |
| 2016/0188623 | A1 | 6/2016 | Finlay et al. |
| 2016/0246834 | A1 | 8/2016 | Regni et al. |
| 2018/0089243 | A1 | 3/2018 | Warren, Jr. |
| 2019/0065557 | A1 | 2/2019 | Boles et al. |

FOREIGN PATENT DOCUMENTS

| | | |
|---|---|---|
| CN | 101779195 | 9/2013 |
| CN | 111226208 | 6/2020 |
| KR | 102382607 | 4/2022 |
| TW | 200535615 | 11/2005 |
| TW | 201314453 | 4/2013 |
| TW | 201921246 A | 6/2019 |
| TW | 201935242 A | 9/2019 |
| WO | WO-2012032727 A1 | 3/2012 |
| WO | WO-2019045961 A1 | 3/2019 |

OTHER PUBLICATIONS

"Taiwanese Application Serial No. 108117591, Office Action dated May 7, 2020", w English translation, 12 pgs.

"Taiwanese Application Serial No. 108117591, Response filed Aug. 10, 2020 to Office Action dated May 7, 2020", w English Claims, 8 pgs.

"Bloom Filter", Wikipedia, [Online], Retrieved from the Internet: <URL: https://en.wikipedia.org/wiki/Bloom_filter>, (Accessed on Jun. 12, 2017), 15 pgs.

"Cuckoo hashing", Wikipedia, [Online], Retrieved from the Internet: <URL: https://en.wikipedia.org/wiki/Cuckoo_hashing>, (Accessed on Jun. 12, 2017), 6 pgs.

"Fadvise(2)—Linux man page",linux, [Online]. Retrieved from the Internet: <URL: https://linux.die.net/man/2/fadvise>, (Accessed on Jun. 12, 2017), 2 pgs.

"International Application Serial No. PCT/US2018/045602, International Search Report dated Dec. 3, 2018", 3 pgs.

"International Application Serial No. PCT/US2018/045602, Written Opinion dated Dec. 3, 2018", 5 pgs.

"KVS Tree", U.S. Appl. No. 15/428,877, 139 pgs.

"Madvise(2) Linux Programmer'sManual", Linux, [Online]. Retrieved from the Internet: <URL: MADVISE(2) Linux Programmer'sManual >, (May 3, 2017), 7 pgs.

"Mincore(2) Linux Programmer'sManual", Linux, [Online]. Retrieved from the Internet: <URL: http://man7.org/linux/man-pages/man2/mincore.2.html>, (May 3, 2017), 3 pgs.

"MMAP(2) Linux Programmer'sManual", Linux, [Online]. Retrieved from the Internet: <URL: http://man7.org/linux/man-pages/man2/mmap.2.html>, (May 3, 2017), 11 pgs.

"Open(2) Linux Programmer'sManual", Linux, [Online]. Retrieved from the Internet: <URL: http://man7.org/linux/man-pages/man2/open.2.html>, (May 3, 2017), 18 pgs.

"Pread(2) Linux Programmer'sManual", Linux, [Online]. Retrieved from the Internet: <URL: http://man7.org/linux/man-pages/man2/pwrite.2.html>, (May 3, 2017), 3 pgs.

Corbet, Jonathan, "fincore()", LWN.net, [Online]. Retrieved from the Internet: <URL: https://lwn.net/Articles/371538/>, (Jan. 27, 2010), 2 pgs.

Patterson, Hugo R, et al., "Informed Prefetching and Caching", Proc. of the 15th ACM Symp. on Operating System Principles, CopperMountain Resort, CO *Department of Electrical and Computer Engineering †School of Computer Science Carnegie Mellon University, (1995), 17 pgs.

"Chinese Application Serial No. 201880063595.1 Voluntary Amendment Filed Oct. 26, 2020", w English Claims, 33 pgs.

"Chinese Application Serial No. 201880063595.1, Office Action dated Jan. 13, 2021", 7 pgs.

"Chinese Application Serial No. 201880063595.1, Response filed May 20, 2021 to Office Action dated Jan. 13, 2021", w/ English Claims, 21 pgs.

"Korean Application Serial No. 10-2020-7008805, Notice of Preliminary Rejection dated Oct. 19, 2021", w/ English translation, 6 pgs.

"Korean Application Serial No. 10-2020-7008805, Response Filed Feb. 17, 2021 to Notice of Preliminary Rejection dated Oct. 19, 2021", w/English Claims, 25 pgs.

"Taiwanese Application Serial No. 110106029, First Office Action dated Mar. 25, 2022", w English translation, 11 pgs.

"Korean Application Serial No. 10-2022-7010712, Notice of Preliminary Rejection dated May 27, 2022", W English Translation, 4 pgs.

REDUCING PROBABILISTIC FILTER QUERY LATENCY

PRIORITY APPLICATION

This application is a continuation of U.S. application Ser. No. 15/691,998 filed Aug. 31, 2017, which is incorporated herein by reference in its entirety.

TECHNICAL FIELD

Embodiments described herein generally relate to block device (e.g., disk) operation and more specifically to reducing probabilistic filter query latency.

BACKGROUND

Computer storage devices comprise a variety of storage technologies that can be divided into block-addressable "disks" such as solid-state drives (SSD) based on NAND or other non-volatile memory (NVM) technology, hard-disk drives (HDD), compact discs (CD), and the like—and byte-addressable "memories"—such as random access memory (DRAM), static random access memory (SRAM), phase change memory (PCM), resistive random access memory (RRAM), or 3D cross point, and the like. Generally, data is moved from disk to memory before it is used by a processor of a computing system. For data stored in a filesystem, the filesystem, or an operating system, often manage this movement, resulting in a filesystem cache in memory reflecting portions of the data stored on disk.

Probabilistic filters are commonly used in data storage systems to efficiently determine whether a data item is stored in a data structure without, for example, having to load the entire data structure from disk. For example, in a key-value data storage system a probabilistic filter can be used to determine the possible existence of a key in a key-store without having to load and search the key-store. Probabilistic filters are generally high-speed and space-efficient data structures that support set-membership tests with a one-sided error. These filters can establish that a given set entry is definitely not represented in the set of entries. If the filter does not establish that the entry is definitely not in the set, the entry can or cannot be in the set. To restate, negative responses (not in set) are conclusive, whereas positive responses (e.g., can be in set) incur a false positive probability (FPP). Generally, the trade-off for this one-sided error is space-efficiency. For example, some probabilistic filters, such as Cuckoo filters and Bloom filters, use approximately seven bits per entry to provide a three percent FPP, regardless of the size of the entries.

There are a variety of probabilistic filters, which include Cuckoo filter and Bloom filters, the operation of which are here provided for illustrative purposes. Cuckoo filter operate by inserting a f-bit fingerprint of a key into one of two buckets. The first bucket is a hash of the key and the second bucket is derived by hashing the fingerprint. If both buckets are full, an existing fingerprint is removed to make space, and then that fingerprint is moved to its own alternate bucket. Locating a key involves inspecting the buckets for a key to determine whether the fingerprint exists. The basic Bloom filter comprises an array (e.g., Bloom filter array) of M bits (initialized to an empty value, such as zero) and k different hash functions that each map a set element to one of the M bits, resulting in a k bit representation of the set element in the Bloom filter. When an element is added to the filter, each of the bits corresponding to the hash functions in the array are set to one. To determine the presence of the element (e.g., performing a Bloom filter query or a Bloom query), the same hash functions are applied to determine the corresponding locations in the array for the queried element. If every location has a value of one, as opposed to zero, then the key can be in the set. If one location has a value of zero, then the key is not in the set.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

As noted above, probabilistic filters are commonly used to test for set membership before performing an expensive operation, such as loading data from disk to memory. The probabilistic filter is a data structure that can be stored on media and, in some data sets, can itself be spread over several loadable units, such as pages, blocks, etc. For example, a probabilistic filter can be partially cached in memory while the remaining portions are resident on disk. Thus, to use the filter, the remaining portions are retrieved from disk and stored in memory to be queried. This operation introduces additional latency when querying probabilistic filters.

Implementations of the present disclosure describe a technique to reduce probabilistic filter query latency. This can be achieved via a check-and-fetch technique whereby, in response to a filter query, currently cached data (e.g., portion of the filter in memory) is checked against the query constraints and the remaining data can be conditionally retrieved from disk and loaded into memory. The conditions for loading the remaining data include whether the cached data provides a definitive answer to the query. For example, Bloom queries can be "short-circuited," or halted, before every bit in the array is checked because any checked bit that is empty (e.g., a zero) provides a definitive answer that the element being tested is not in the set. Thus, if any cached portion of the filter indicates negative set membership, there is no need to load the remainder of the filter from disk. If the cached filter portions do not provide a definitive answer (e.g., all corresponding bits have a non-empty value), then the remaining portions of the filter are loaded from disk while the results of the partial check (e.g., the cached data portions) are returned to the caller. Thus, while the calling application processes the partial filter query results, the disk-to-memory loading of the filter has commenced and can be ready for the calling application to use when the partial query results are processed. This sequence reduces latency in the filter query by providing an answer to the query without loading the entire filter from disk in some cases and allowing the processing application to investigate a subset of the filter in other cases. To simplify the discussion, a standard Bloom filter is used to illustrate the described techniques, though the techniques can be used on other probabilistic filters or data structures that satisfy the "short-circuit" principle discussed above.

Figure 1:
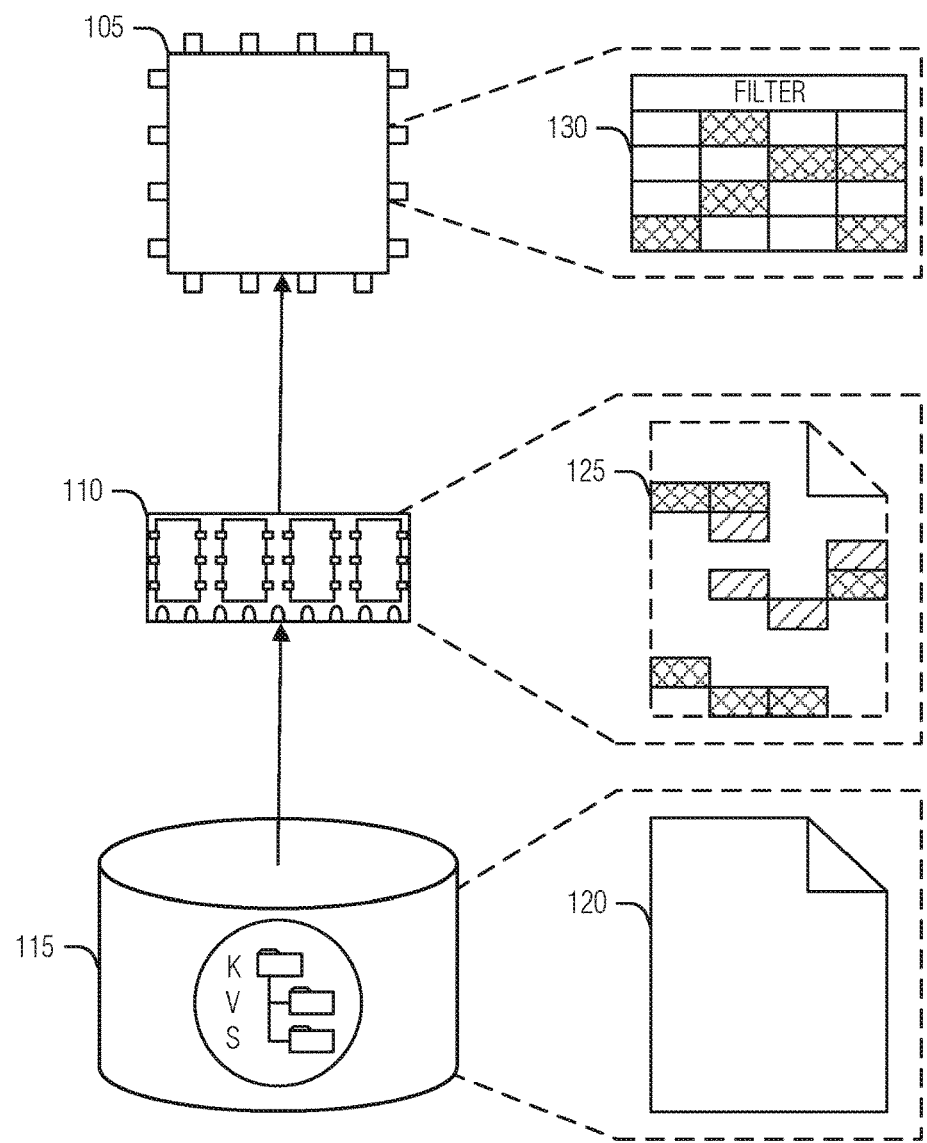
FIG. 1 is a block diagram of an example of a system for reducing probabilistic filter query latency, according to an embodiment.

FIG. 1 is a block diagram of an example of a system 100 for reducing probabilistic filter query latency, according to an embodiment. As illustrated, the system 100 includes a first media 115 (e.g., a disk with a KVS tree and corresponding key-value set file 120), a second media 110 (e.g., memory with cached segments 125 of the key-value set file 120), and processing circuitry 105 (e.g., processor). The processing circuitry 105, the second media 110, and the first media 115 are all implemented in electronic hardware. As illustrated, the cross-hatched blocks of the cached segments 125 correspond to segments of the probabilistic filter 130 being queried. Here, the segments correspond to a division of the file 120 or filter 130, such as may occur when the file is divided into blocks, memory pages (e.g., pages), or some other division.

The processing circuitry 105 is arranged (e.g., hardwired or configured by software) to receive, from a caller, a query for the probabilistic filter 130 that is stored on a first media 115. Here, the caller is an application, component, or other entity capable of making the request. For example, the processing circuitry 105 can implement an operating system (OS) managing disk access and the caller is an application making a request to the OS. Thus, a user-space (e.g., as opposed to kernel-space) process can instigate the query via an OS call.

In an example, the query includes segment identifiers of the probabilistic filter 130. Here, the segment identifiers specify which segments, out of all segments of the probabilistic filter 130, are pertinent to the query. A segment is pertinent to the query if it can provide a result to the query. For example, probabilistic filter 130 may be a Bloom filter for a key-value set that spans four virtual memory (VM) pages where the corresponding buckets in the Bloom filter array for the k hashes of a key in a query against the Bloom filter are in the first and the third VM pages, then the first and the third VM pages are pertinent segments of the Bloom filter for the query of the key. Because the querying entity (such as a filesystem, OS, program, etc.) can perform the Bloom hashes, that entity can also provide the segments of interest for the query when making the call. In an example, the segment identifiers are byte offsets in a file 120. In an example, the query includes a file identifier for the file 120.

In an example, the file 120 is a key-value set file. A key-value set (e.g., kvset) is a data structure used to hold key-value entries in a KVS tree. KVS trees are a tree data structure including nodes with connections between a parent node and a child node based on a predetermined derivation of a key rather than the content of the tree. The nodes include temporally ordered sequences of key-value sets, also known as KVSs. The key-value sets contain key-value pairs in a key-sorted structure. Key-value sets in KVS trees are immutable once written. The KVS tree achieves the write-throughput of WB trees while improving upon WB tree searching by maintaining key-value sets in nodes, the key-value sets including sorted keys, as well as key metrics such as Bloom filters. Thus, in this example, the file 120 includes at least one key-value set that can include the filter 130.

In an example, the key-value set file includes more than one KVS tree (e.g., components, such as meta data, key-value sets, etc., from more than one KVS tree, not necessarily entire KVS trees). In an example, the probabilistic filter 130 applies to a single KVS tree in the key-value set file. Combining multiple key-value sets into a single key-value set file, or other data structures into a single file, may leverage characteristics of an environment. For example, if an operating system imposes significant overhead for file management, file loads, etc., it can be more efficient to combine several entities into a file to reduce these overheads.

In an example, the query includes a set of test parameters. Herein the test parameters indicate what the query will test against the filter 130. For example, the test parameters can be the indexes in a Bloom filter where a key's bits can be found. In an example, the test parameters include a location (e.g., in the filter 130). In an example, the location is a bit offset in a segment.

The processing circuitry 105 is arranged to obtain, in response to receiving the query, cached segments 125 of the probabilistic filter 130 stored on a second media 110. Here, the cached segments 125 are less than all of the probabilistic filter 130 stored on the first media 115 (e.g., the file 120). Thus, to obtain the cached segments 125 in response to the query, the processing circuitry 105 may read the cached segments 125 from the second media 110. In an example, segments of the probabilistic filter 130 are based on a representation of the probabilistic filter 130 in the second media 110. Thus, while the file 120 can be segmented in blocks defined by the first media 115 (e.g., disk), in the second media 110 (e.g., memory), the segments are defined as the page size for the memory. In an example, the segments have a uniform size. In an example, the uniform size is a memory page size. In an example, the segment identifiers are page identifiers. In an example, the segment identifiers are memory addresses. In an example, wherein the query includes segment identifiers, obtaining the cached segments 125 includes obtaining segments of the probabilistic filter in the second media 110 that correspond to the segment identifiers.

The processing circuitry 105 is arranged to execute the query on the cached segments 125 resulting in a partial query result. In an example, where the query includes test parameters, the partial query result includes results for a subset of the test parameters performed on the cached segments 125. In an example, where the test parameters include one or more locations (e.g., indexes in a Bloom filter array), the subset of the test parameters include a bit value (e.g., to test for) in each location. In an example, the partial query results include a listing of segment identifiers that are pertinent to the query and not in the cached segments 125.

The processing circuitry 105 is arranged to initiate retrieval of the remaining data of the probabilistic filter 130 from the first media 115 to the second media 110 without intervention from the caller while executing the query on the cached segments 125. Here, the remaining data corresponds to the query and data that is not in the cached segments 125 (e.g., the part of the filter 130 that is not in the cached segments 125). Thus, the caller does not have to make a separate request to load the remaining segments from the file 120. Reducing the number of calls made by the caller often results in reduced overhead and reduced latency for the system 100. In an example, the processing circuitry 105 is arranged to identify a stop condition of the probabilistic filter 130 in the partial query result and avoid the retrieval of the remaining data. This example illustrates the "short-circuit" operation where the query can be answered by the partial query results. For example, in a Bloom filter with a cached segment 125 that includes an index for a key that is zero (e.g., empty), there is no need to load the remaining data because the key is not in the set represented by the Bloom filter. In an example, the probabilistic filter is at least one of a Bloom filter, a Counting Bloom filter, or a Cuckoo filter.

The processing circuitry 105 is arranged to return the partial query results to the caller. The partial query results represent that the query was performed on part of the filter 130, as well as possibly identifying what segments of the filter 130 were omitted from the query performance because they were not in the second media 110. Thus, the caller's request is partially fulfilled with respect to the probabilistic query, and the remaining segments of the query are also loaded from disk. In an example, where test parameters are provided by the caller, the partial query results include results for a subset of the test parameters performed on the cached segments 125. In an example, the partial query results include a listing of segment identifiers that are pertinent to the query and not in the cached segments 125.

In an example, the processing circuitry 105 is arranged to receive—e.g., by the caller the partial query result, search the subset of test parameters for a stop condition (e.g., a condition defined to halt the search when true) defined by the probabilistic filter 130, and search for the stop condition (e.g., to stop the search) within segments of the segment identifiers when the stop condition is not found in the subset of test parameters. Here, the segments are resident in the second media 110 as a result of initiating the retrieval of the remaining data of the probabilistic filter. That is, the initiated retrieval of the remaining data has completed for example, while the partial query result is being searched by the caller to determine whether the filter 130 indicates the possible existence of the queried key putting the remaining data in the second media 110. Thus, the single result of the query provides the caller with both the results of the filter query on the cached segments 125, as well as identification of the remaining segments that, at this time, should have been loaded from the first media 115 to the second media 110, allowing the caller to perform the rest of the filter query.

The check-and-fetch techniques described herein have several advantages over traditional techniques that test whether file pages are cached (e.g., Linux fincore), or loading non-cached file pages (e.g., Linux fadvise). For example, check-and-fetch techniques described herein can obtain page residency information—e.g., the values of bits of interest in cached pages—and can initiate background load of non-cached pages in a single system call. Generally, techniques such as fincore or fadvise use at least three system calls to accomplish the same task, greatly reducing performance. For example, to accomplish check-and-fetch, the traditional fincore and fadvise use one or more file reads from cached pages and finally the fadvise call for non-cached pages. Further, check-and-fetch techniques described herein can operate on non-consecutive pages in a file. Generally, techniques such as fincore and fadvise, only operate on consecutive pages in a file. Again, existing methods use multiple system calls each to operate on non-consecutive pages, greatly reducing performance. Additionally, check-and-fetch techniques described herein can specify the order that file pages will be referenced. This provides an opportunity to optimize page loads. This information is not communicated by existing methods, for example fadvise which is limited to "random" and "sequential".

The advantages above pertain to file based access techniques, but check-and-fetch techniques described herein also have advantages over memory based file accesses (e.g., when a file is memory mapped). In this context, existing techniques, such as Linux mincore and Linux madvise, are at a disadvantage. For example, check-and-fetch techniques described herein can obtain page residency information and can initiate background load of non-cached pages in a single system call. Again, existing techniques use at least two system calls to accomplish the same task (e.g., mincore is called and then madvise). Further, check-and-fetch can operate on non-consecutive pages in a file, in contrast to other techniques (e.g., mincore and madvise) that generally operate on consecutive pages in a file. Again, existing techniques use multiple system calls each to operate on non-consecutive pages, which again greatly reduces performance. Additionally, check-and-fetch can specify the order that file pages will be referenced, which provides the opportunity to optimize page loads. This information is generally not communicated by existing technique, such as madvise, which is limited to "random" and "sequential".

To illustrate the present technique on a real-world example, a Linux operating system with a Linux virtual file system (VFS) to support KVS trees is used in the following examples, although other operating systems or filesystems can be similarly modified. Each key-value set in a KVS tree can include a Bloom filter to track the keys associated with the entries (e.g., key-value pairs or tombstones, where tombstones indicate that a value corresponding to a key is deleted) stored in that key-value set. A Linux VFS can be implemented that exposes key-value sets stored on disk as read-only files to both user-space processes and the Linux kernel. A Bloom filter in such a key-value set file comprises a consecutive sequence of bytes starting at a known offset (in bytes) and with a known size (in bytes). In accordance with standard file operations, data read from a key-value set file is in the standard Linux page cache in memory) in units that are each the size of a virtual memory (VM) page. Each such unit starts at a zero-based offset in the key-value set file that is a multiple of the VM page size. For example, given a VM page size of 4096 bytes, pages in a key-value set file start at offsets 0, 4096, 8192, etc. In an example, as with other files, a user-space process can optionally memory-map key-value set files into the processes' virtual address space using the standard Linux mmap system call. Here, the user-space process can access key-value set data, including Bloom filters, via memory read commands and the operating system (or VM manager) manages the disk-to-memory loading of the underlying bits.

Figure 2:
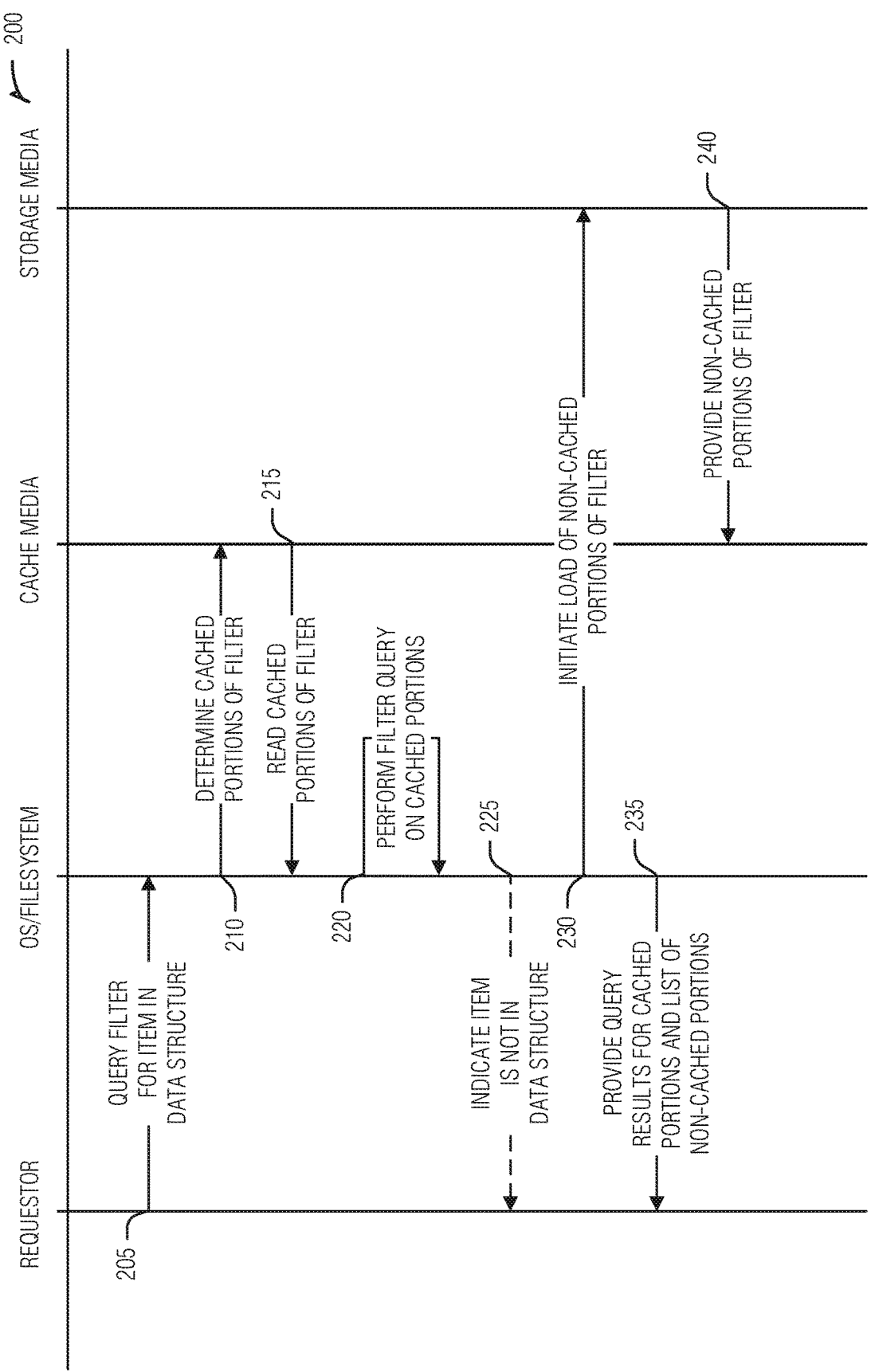
FIG. 2 is a swim-lane diagram of an example of a control-flow for reducing probabilistic filter query latency, according to an embodiment.
Figure 3:
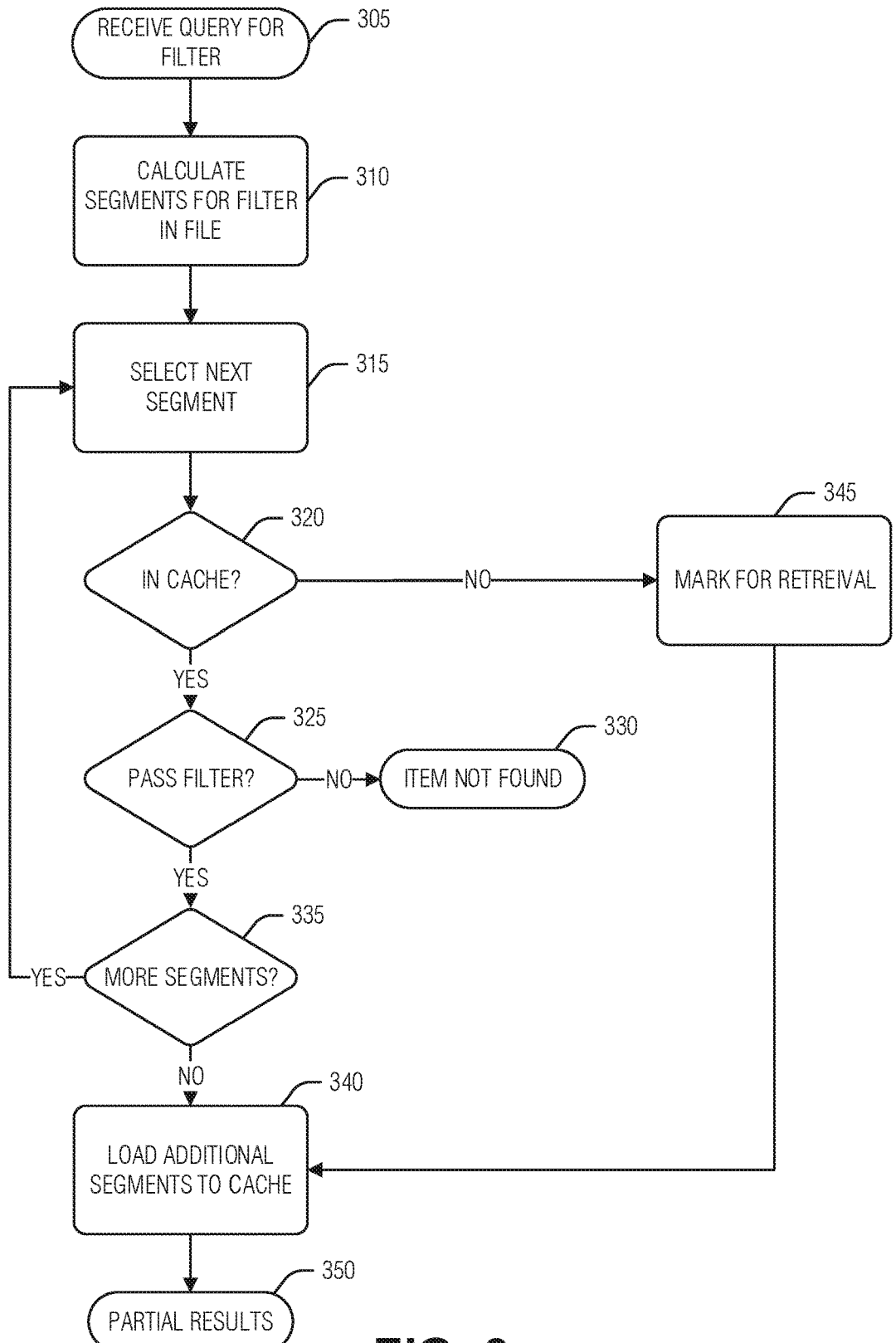
FIG. 3 is a flow diagram of an example of a method for reducing probabilistic filter query latency, according to an embodiment.
Figure 4:
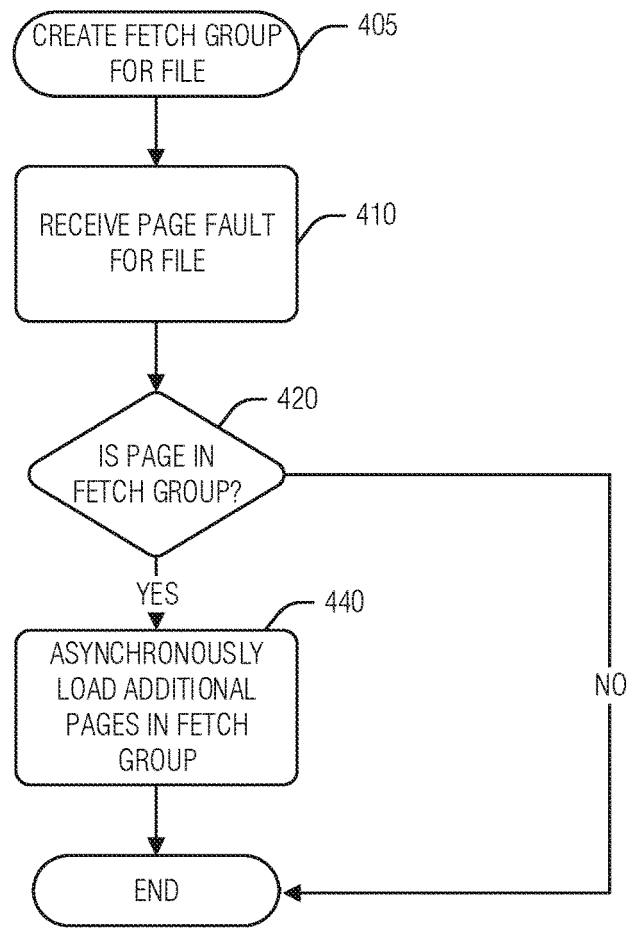
FIG. 4 is a flow diagram of an example of a method for reducing probabilistic filter query latency, according to an embodiment.

FIGS. 2-4 present a variety of examples that are described with the following context. The following definitions assume a Bloom filter B in a key-value set file F and a hash function H that maps a key K to a bit in B:

BF_FILE_OFFSET_BYTE(F, B) is the byte offset in key-value set file F of the first byte of Bloom filter B.

BF_SIZE_BYTE(F, B) is the size in bytes of Bloom filter B in key-value set file F.

BF_OFFSET_BIT(B, H, K) is the bit offset in Bloom filter B selected by executing hash function H for key K.

VMPAGE_SIZE_BYTE(F) is the size in bytes of pages in key-value set file F.

As described herein, all byte offsets in key-value set file F are zero-based. That is, the first byte in key-value set file F is defined to be at offset zero (0). Also, as described, all bit offsets in Bloom filter B are also zero-based; the first bit in Bloom filter B defined to be at offset zero (0). Although these zero-based indices are used herein, they are not required (e.g., a first bit may be at offset one (1)). Further, as used herein, floor(x) is defined as the greatest integer less-than-or-equal-to the real number x.

Given these definitions, the following can be computed:

BFPAGE_FILE_OFFSET_FIRST_BYTE(F, B)= floor(BF_FILE_OFFSET_BYTE(F, B)/VMPAGE_SIZE_BYTE(F))*VMPAGE_SIZE_BYTE(F), which is the byte offset of the page in key-value set file F containing the first byte of Bloom filter B.

BFPAGE_FILE_OFFSET_LAST_BYTE(F, B)= floor((BF_FILE_OFFSET_BYTE(F, B)+BF_SIZE_BYTE(F, B)−1)/VMPAGE_SIZE_BYTE(F))*VMPAGE_SIZE_BYTE(F), which is the byte offset of the page in key-value set file F containing the last byte of Bloom filter B.

BFPAGE_COUNT(F, B) ((BFPAGE_FILE_OFFSET_LAST_BYTE(F, B)−BFPAGE_FILE_OFFSET_FIRST_BYTE(F, B))/VMPAGE_SIZE_BYTE(F))+1, which is the count of pages in key-value set file F containing at least one byte of Bloom filter B.

HBYTE_FILE_OFFSET_BYTE(F, B, H, K)=BF_FILE_OFFSET_BYTE(F, B)+floor(BF_OFFSET_BIT(B, H, K)/8), which is the byte offset of the byte in key-value set file F containing the bit in Bloom filter B selected by executing hash function H for key K.

HBYTE_OFFSET_BIT(F, B, H, K)=BF_OFFSET_BIT(B, H, K) modulo 8, which is the bit offset in the byte of key-value set file F at offset HBYTE_FILE_OFFSET_BYTE(F, B, H, K) that is the bit in Bloom filter B selected by executing hash function H for key K.

HPAGE_FILE_OFFSET_BYTE(F, B, H, K)=floor (HBYTE_FILE_OFFSET_BYTE(F, B, H, K) VMPAGE_SIZE_BYTE(F))*VMPAGE_SIZE_BYTE(F), which is the byte offset of the page in key-value set file F containing the bit in Bloom filter B selected by executing hash function H for key K.

HPAGE_OFFSET_BIT(F, B, H, K)=((8*BF_FILE_OFFSET_BYTE(F, B))+BF_OFFSET_BIT(B, H, K)) modulo (8*VMPAGE_SIZE_BYTE(F)), which is the bit offset in the page of key-value set file F at byte offset HPAGE_FILE_OFFSET_BYTE(F, B, H, K) that is the bit in Bloom filter B selected by executing hash function H for key K.

These values, once calculated, can be used in a variety of ways. For example, to read the bit in Bloom filter B selected by executing hash function H for key K, the following operations may be used:

Read into a memory buffer the page in key-value set file F starting at byte offset HPAGE_FILE_OFFSET_BYTE(F, B, H, K); and then Read the hit of interest from said memory buffer at bit offset HPAGE_OFFSET_BIT(F, B, H, K).

In another example, to read the bit in Bloom filter B selected by executing hash function H for key K, the following operations may be used:

Read into a memory buffer the byte in key-value set file F at byte offset HBYTE_FILE_OFFSET_BYTE(F, B, H, K); and then Read the bit of interest from said memory buffer at bit offset HBYTE_OFFSET_BIT(F, B, H, K).

As noted above, the context within which several examples presented below includes these definitions and calculated values.

FIG. 2 is a swim-lane diagram of an example of a control-flow 200 for reducing probabilistic filter query latency, according to an embodiment. The following examples refer to a file-based check-and-fetch technique in the context of the Linux OS. This technique determines which, if any, segments of a specified set of key-value set file pages containing Bloom filter data are in the Linux page cache and, asynchronously loads the balance of those pages only if needed. In addition, the technique provides information about the values of specified bits in pages that are in the page cache (e.g., cached pages). In an example, the check-and-fetch technique is part of a VFS. In an example, the technique is executed by a user-space process via a system call. In an example, the technique is executed by the Linux kernel via a direct method call (e.g., a standard C-language function call).

The control flow 200 illustrates the operation of the check-and-fetch function between the requestor (e.g., caller), the OS or filesystem, the cache media (e.g., memory or memory subsystem), and storage media (e.g., disk or disk subsystem). After the caller executes the check-and-fetch function as part of a Bloom query (operation 205) the cached portions of the Bloom filter array are determined (operation 210). The portions of the Bloom filter array in cache are read (215) and the Bloom query is performed on them (operation 220). If the result of operation 220 indicates that the query term is not in the Bloom filter, the handler (e.g., OS or filesystem) returns an indication that the query term (e.g., item) is not in the key-value set (operation 225). In an example, the indication is returned as part of the partial query results.

If the handler cannot completely resolve the query (e.g., the cached portions of the Bloom filter indicate that the query term might be in the key-value set), an asynchronous load of the non-cached portions of the Bloom filter array is initiated (operation 230). Here, asynchronous is an operation for which the caller does not block (e.g., wait) to complete before moving on to another operation. Thus, the handler can immediately provide the query results for the cached portions (e.g., a partial query result) (operation 235) without waiting for the non-cached portions of the Bloom filter array to be moved from the storage media to the cache media (operation 240).

The following illustrates an example of file-based check-and-fetch using pseudo code. First, the following structure and prototype are used in the technique:

```
struct page_info {
    offset_type page_offset; // byte offset of a
    page in a file
    offset_type bit_offset; // bit offset in said
    page
};
file_check_fetch(file_handle fd, struct page_info
*pagev, boolean_type *page_cached, boolean_type
*bit_set, integer count);
```

Where:

fd is a handle for an open key-value set file that is an input to the check-and-fetch function (e.g., a file descriptor returned by a Linux VFS in response to an open system call).

pagev is an array of page_info structures that is an input to the function. Here, each element of pagev specifies the byte offset of a page (e.g., "page_offset") in key-value set file fd, and a bit offset in that page (e.g., "bit_offset"), as described below.

page_cached is an array of Boolean values set as an output of the function, as described below.

bit_set is an array of Boolean values set as an output of the function, as described below.

count is an integer number of elements in the pagev, page_cached, and bit_set arrays that is an input to the function.

In the following, given an array A, the notation A[i] refers to the i-th element of A, where the first element is A[0], which is to say that array elements are zero-based. Given the above, the following operations are performed by the file-based check-and-fetch technique:

```
set Boolean do_load to TRUE;
FOR i=0 to count-1 DO:
    IF the page in key-value set file fd at byte
    offset pagev[i].page_offset is in the Linux
    page cache THEN:
        set page_cached[i] to TRUE;
        IF the bit in that page at bit offset
        pagev[i].bit_offset is one (1) THEN:
            set bit_set[i] to TRUE;
        ELSE:
            set bit_set[i] to FALSE;
            IF bit_set[i] is FALSE THEN:
                set do_load to FALSE;
    ELSE:
        set both page_cached[i] and bit_set[i] to
        FALSE; // though in this case the value
        of bit_set[i] is in fact unknown and must
        be ignored).
ENDFOR
IF do_load is TRUE THEN:
    // Only load non-cached pages if Bloom query
    // not resolved.
    FOR i=0 to count-1 DO:
        IF page_cached[i] is FALSE, THEN:
            initiate an asynchronous load (from
            disk into the page cache) of the
            page in key-value set file fd at
            byte offset pagev[i].page_offset if
            not previously initiated.
    ENDFOR
DONE
```

In an example, the file check fetch function assumes that non-cached key-value set file pages will be read in the order they appear in array pagev, and can take this into account to optimize loading these pages (e.g., selecting a next page in the sequence to load). To perform a Bloom query using the call described above, a user-space process (or other caller) can perform the following. Given a Bloom filter B in a key-value set file F, and an array H of J hash functions H[0], . . . , H[J−1] that each map a key to a hit in B, a Bloom query for key K can be executed via the following operations:

```
obtain a file handle fd for key-value set file F;
obtain an array pagev comprising J page_info
structures;
obtain an array page_cached comprising J Boolean
elements;
obtain an array bit_set comprising J Boolean
elements;
obtain an array mbuf comprising VMPAGE_SIZE_BYTE (F)
bytes.
FOR i=0 to J-1 DO:
    compute HPAGE_FILE_OFFSET_BYTE(F, B, H[i], K)
    and store the result in pagev[i].page_offset;
    compute HPAGE_OFFSET_BIT(F, B, H[i], K) and
    store the result in pagev[i].bit_offset;
ENDFOR
sort the elements of array pagev such that
pagev[s].page_offset <= pagev[r].page_offset for 0
<= s <= r <= J-1 (e.g., sorted in an ascending page
offset order);// a given page offset can appear in
pagev more than once.
execute file_check_fetch(fd, pagev, page_cached,
bit_set, J);
FOR i=0 to J-1 DO:
    // First examine Bloom filter bit values from
    // pages that were already cached when
    // file_check_fetch was executed.
    IF page_cached[d] is TRUE and bit_set[i] is
    FALSE THEN:
        stop the query and return FALSE; // K is
        not in the key set tracked by Bloom
        filter B.
ENDFOR
FOR i=0 to J-1 DO:
    // Only if examining Bloom filter bit
    // values from pages that were not cached when
    // file_check_fetch was executed.
    IF page_cached[d] is TRUE THEN:
        continue to next iteration of loop;
    ELSE:
        IF i==0 or pagev[1].page_offset !=
        pagev[i-1].page_offset THEN:
            read into mbuf the page in key-value
            set file F starting at byte offset
            pagev[i].page_offset; //e.g., using
            the standard Linux pread system
            call.
        IF the bit in mbuf at bit offset.
        pagev[i].bit_offset is zero (0) THEN:
            stop the query and return FALSE; //
            K is not in the key set tracked by
            Bloom filter B.
ENDFOR.
return TRUE from the Bloom query;
DONE.
```

FIG. 3 is a flow diagram of an example of a method 300 for reducing probabilistic filter query latency, according to an embodiment. The operations of the method 300 are performed using computer hardware such as that described above or below. As previously noted, a user-space process can optionally memory-map key-value set files into its virtual memory address space using the standard Linux mmap system call, or the like. In this case, a user-space process can access key-value set data, including Bloom filters, via memory read operations. Query latency can be improved with a memory-based check-and-fetch function that operates similarly to the file-based check-and-fetch function described earlier. In an example, the file-based check-and-check pseudo code example can also be used with memory-mapped files.

A Bloom query is received (operation 305). The handler of the query can calculate segments from the key-value set file that are pertinent to the query (operation 310). In this example, the query provides the file identifier and the query, term (e.g., key in a key-value set query) and the OS calculates which portion of the key-value set file contains the specific portions of the Bloom filter array to which the key hashes (e.g., indexes of the array corresponding to the results of the k hashes). In memory mapped files, this determination involves calculating the bit offset of the multiple array indices from the byte offsets of the pages for the Bloom filter in the memory mapped key-value set file.

Once the pertinent segments of the filter are determined, the segments are processed. This process includes selecting a next segment (operation 315) and determining whether that segment is in the cache (operation 320). If the segment is not in the cache, mark the segment for retrieval (operation 345). In an example, marking the segment for retrieval does not actually initiate retrieval of the segment, but rather indicates that the segment will be retrieved if the additional data can be used to complete the query. In either case (e.g., retrieving the segment or marking without retrieving), the operation 345 is asynchronous.

If the segment is in the cache, it is tested to determine whether the filter passes (operation 325). With a standard Bloom filter, the query does not pass if any array index corresponding to the key is set to zero. If the filter does not pass, the method 300 can be terminated and return an indication that the query term is not part of the set (operation 330). If, however, the filter passes, and there are more segments (operation 335), the processing continues until there are no segments or the filter does not pass.

After the segments have been processed, and the method 300 did not exit due to the filter not passing, the marked segments are loaded from disk to memory (operation 340). At this juncture, the method 300 exits, returning the partial results to the caller.

The memory-based check-and-fetch function is described below that determines which (if any) of a specified set of memory-mapped key-value set file pages containing Bloom filter data are in the Linux page cache and causes the balance of those pages to be loaded asynchronously only if they are needed to complete the query. The example function also provides information about the values of specified bits in cached pages. In this example, the memory-based check-and-fetch function is implemented in a VFS and executed by a user-space process via a system call. The following data structure and prototype are used by the function:

```
struct page_addr_info {
    // VM address mapped to the first byte of a
    // page in a file
    address_type page_addr;
    // bit offset in said page
    offset_type bit_offset;
};
mem_check_fetch(struct page_addr_info *addrv,
boolean_type *page_cached, boolean_type *bit_set,
integer count);
```

Where:

addrv is an array of page_addr_info structures that is an input to the method; each element of addrv specifies a process virtual memory address corresponding to the first byte of a memory-mapped key-value set file page (page_addr) and a bit offset in that page (bit_offset), as described below.

page_cached is an array of Boolean values set as an output of the method, as described below.

bit_set is an array of Boolean values set as an output of the method, as described below.

count is the integer number of elements in the addrv, page_cached, and bit_set arrays that is an input to the method.

In the following, given an array A, the notation A[M] refers to the i-th element of A, where the first element is A[0]. Given the above, the following operations are performed by the memory-based check-and-fetch technique:

```
set Boolean do_load to TRUE.
FOR i=0 to count-1 DO:
    determine the key-value set file page
    associated with addrv[i].page_addr;
    IF the key-value set file page is in the Linux
    page cache THEN:
        set page_cached[i] to TRUE;
        If the bit in that page at bit offset
        addrv[i].bit_offset is one (1) THEN:
            set bit_set[i] to TRUE;
        ELSE:
            set bit_set [i] to FALSE;
        IF bit_set[i] is FALSE THEN:
            set do_load to FALSE;
    ELSE:
        set both page_cached[i] and bit_set [i] to
        FALSE; //though in this case the value of
        bit_set [i] is in fact unknown and must be
        ignored.
END FOR
IF do_load is TRUE THEN:
    // Only load non-cached pages if Bloom query
    // not resolved.
    FOR i=0 to count-1 DO:
        IF page_cached[i] is FALSE THEN:
            initiate an asynchronous load from disk
            into the page cache of the key-value set
            file page associated with
            addrv[i].page_addr, if not previously
            initiated;
    ENDFOR
DONE
```

In an example, the mem_check_fetch function assumes non-cached key-value set file pages will be read in the order that they appear in array addrv, and can take this into account to optimize loading these pages. In an example, mem_check_fetch allows the addrv array to specify addresses associated with (mapped-to) pages in more than one key-value set file. The following pseudo code illustrates how to perform a Bloom query using the mem_check_fetch function. Given a Bloom filter B in a memory-mapped key-value set file F, and an array H of J hash functions H[0], . . . , H[J−1] each mapping a key to a bit in B, a Bloom query for key K can be executed via the following operations:

```
define
    struct bloom_addr_info {
        // VM address mapped to the first byte of a
        // page in a file
        address_type page_addr;
        // bit offset in said page
        offset_type page_bit_offset;
        // VM address mapped to byte containing bit
        of interest in a file
        address_type byte_addr;
        // bit offset in said byte
        offset_type byte_bit_offset;
    };
obtain the process memory address faddr that is
mapped to the first byte of memory-mapped key-value
set file F;
obtain an array bloom_addrv comprising J
bloom_addr_info structures;
obtain an array page_addrv comprising J
page_addr_info structures;
obtain an array page_cached comprising J Boolean
elements;
obtain an array bit_set comprising J Boolean
elements;
FOR i=0 to J-1 DO:
    compute (faddr + HPAGE_FILE_OFFSET_BYTE(F, B,
    H[i], K)) and store the result in
    bloom_addrv[i].page_addr;
```

```
    compute HPAGE_OFFSET_BIT(F, B, H[i], K) and
    store the result in
    bloom_addrv[i].page_bit_offset;
    compute (faddr + HBYTE_FILE_OFFSET_BYTE(F, B,
    H[i], K)) and store the result in
    bloom_addrv[i].byte_addr;
    compute HBYTE_OFFSET_BIT(F, B, H[i], K)) and
    store the result in
    bloom_addrv[i].byte_bit_offset;
ENDFOR
sort the elements of array bloom_addrv such that
bloom_addrv[s].page_addr <=
bloom_addrv[r].page_addr for 0 <= s <= r <= J-1
(e.g., into an ascending virtual memory address
order); // a given page address can appear in
bloom_addrv more than once.
FOR i=0 to J-1 DO:
    set page_addrv[i].page_addr equal to
    bloom_addrv[i].page_addr;
    set page_addrv[i].bit_offset equal to
    bloom_addrv[i].page_bit_offset;
END FOR
execute mem_check_fetch(page_addrv, page_cached,
bit_set, J);
FOR i=0 to J-1 do:
    // First examine Bloom filter bit values from
    // pages that were already cached when
    // mem_check_fetch was executed.
    If page_cached[i] is TRUE and bit_set [i] is
    FALSE THEN:
        stop the query and return FALSE; // K is not
        in the key set tracked by Bloom filter B.
    ENDFOR
FOR i=0 to J-1 do:
    // Only if needed to examine Bloom filter bit
    // values from pages that were not cached when
    // mem_check_fetch was executed.
    IF page_cached[i] is TRUE THEN:
        continue to next iteration of loop.
    IF the bit at bit offset
    bloom_addrv[i].byte_bit_offset in the byte at
    process virtual memory address
    bloom_addrv[i].byte_addr is zero (0) THEN:
        stop the query and return FALSE; // K is not
        in the key set tracked by Bloom filter B.
    ENDFOR
return TRUE from the Bloom query;
DONE;
```

The embodiment of mem_check_fetch described above assumes key-value set files are memory-mapped in full (e.g., the entire file is mapped) to a consecutive sequence of virtual memory addresses. If key-value set files are memory-mapped in part, for example only the portions containing Bloom filter data are mapped, then memory offsets used in the above technique are adjusted accordingly.

FIG. 4 is a flow diagram of an example of a method 400 for reducing probabilistic filter query latency, according to an embodiment. The operations of the method 400 are performed using computer hardware such as that described above or below. The techniques described above with respect to FIGS. 2 and 3 invoke an explicit and conditional asynchronous load of probabilistic filter data from disk to memory because the calling process expects the asynchronous load to occur unless the query can be answered with the cached portions of the probabilistic filter. Thus, for memory-mapped key-value set files, the mem_check_fetch function allows user-space processes to explicitly initiate asynchronous loading of pages containing Bloom filter data into the Linux page cache. An alternative, or complimentary, technique uses an implicit asynchronous load of non-cached segments from a probabilistic filter. For example, a memory-based "fetch group" function allows user-space processes to implicitly initiate asynchronous loading of pages containing Bloom filter data into the Linux page cache by defining a group of pages as a group (e.g., the fetch group) and loading the entire group when there is a page fault in a member of the group.

The method 400 begins by creating a fetch group (operation 405). The fetch group includes pages in a file that are related to each other. The fetch group can be created by specifying which pages to group and storing the page identification in a data structure (e.g., table, array, etc.). In an example, the pages are related by their use in storing a probabilistic filter.

Once the fetch group is created, it is consulted when there is a page fault (operation 410). Here, a page fault is a reference to a page that is not resident in memory (e.g., it needs to be loaded from disk to be used). If there is a page fault, the fetch group is checked to determine whether the page that faulted is in the fetch group (operation 420). If it is, the other pages in the fetch group are asynchronously loaded (operation 440). After initiating the asynchronous load, or if the page that faulted is not in a fetch group, the method 400 ends. This technique is implicit because a process simply requests pages to perform the Bloom (or other probabilistic) query and the entirety of the non-cached pages are asynchronously loaded when a first examined page is not in the cache.

As illustrated below, the mem_fetch_group function operates on memory-mapped key-value set files. Like the file_check_fetch and mem_check_fetch functions, the mem_fetch_group function can be implemented in a VFS and executed by a user-space process via a system call. The following is a prototype of the mem_fetch_group function:

```
mem_fetch_group (address_type *addrv, integer
count;)
```

Where:
addrv is an array of address_type values that is an input to the method; each element of addrv specifies a process virtual memory address corresponding to the first byte of a memory-mapped key-value set file page.
count is the integer number of elements in the addrv array that is an input to the method.
In the following, given an array A, the notation A[i] refers to the i-th element of A, where the first element is A[0]. Given the above, the following operations are performed to implement the fetch group technique:

```
create an entry in a FetchGroup table identifying
the key-value set file pages associated with
addresses addrv[0], ..., addrv[count-1] as all
belonging to the same fetch group.
DONE;
```

After the FetchGroup table is populated (e.g., the fetch group is defined), in response to a VM page fault that instigates loading a page from a memory-mapped key-value set file, the VFS performs the following operations:

```
determine the faulted-page; //This is the key-
value set file page associated with the process
VM address that generated the page fault.
initiate a load of the faulted-page from disk
into the Linux page cache.
```

```
        IF the faulted-page is a member of a fetch group
        in the FetchGroup table THEN:
            initiate asynchronous load of all the other
            key-value set file pages belonging to that
            fetch group not already present in the
            Linux page cache;
        DONE;
```

In an example, non-cached key-value set file pages in a fetch group are read in the order specified by the addrv input to the mem_fetch_group execution that created the corresponding FetchGroup table entry. A handler (e.g., VFS) can use this order to optimize loading these pages. In an example, the mem_fetch_group function allows the addrv array to specify addresses corresponding to (e.g., mapped to) pages in more than one key-value set file. The following pseudo code illustrates how to perform a Bloom query using the mem_fetch_group function. Given a Bloom filter B in a memory-mapped key-value set file F, and an array H of J hash functions H[0], . . . , H[J−1] that each map a key to a bit in B, a Bloom query for key K can be executed as follows:

```
        define struct query_info {
            // VM address mapped to byte containing bit of
            // interest in a file
            address_type byte_addr;
            // bit offset in said byte
            offset_type bit_offset;
        };
```

First, perform the following steps to establish a fetch group for Bloom filter B:

```
        obtain the process virtual memory address faddr
        mapped to the first byte of memory-mapped key-
        value set file F;
        compute BFPAGE_COUNT (F, B) and store the result
        in integer count;
        obtain an array addrv comprising count
        address_type elements;
        FOR i=0 to count-1 DO:
            Compute (faddr +
            BFPAGE_FILE_OFFSET_FIRST_BYTE(F, B) + (i *
            VMPAGE_SIZE_BYTE (F))) and store the result
            in addrv[i];
        END FOR
        execute the method mem_fetch_group(addrv,
        count);
        DONE;
```

Then, at some time in the future, execute a Bloom query for key K as follows:

```
        obtain the process virtual memory address faddr
        mapped to the first byte of memory-mapped key-
        value set file F;
        obtain an array queryv comprising J query_info
        structures;
        FOR i=0 to J-1 DO:
            compute (faddr + HBYTE_FILE_OFFSET_BYTE (F,
            B, H[i], K)) and store the result in
            queryv[i].byte_addr;
            compute HBYTE_OFFSET_BIT (F, B, H[i], K) and
            store the result in queryv[i].bit_offset;
        ENDFOR
        sort the elements of array queryv such that
        queryv[s].byte_addr <= queryv[r].byte_addr for 0
        <= s <= r <= J-1; // e.g., in an ascending
        virtual memory address order. Here, a given byte
        address can appear in queryv more than once.
        FOR i=0 to J-1 DO:
            IF the bit at bit_offset
            queryv[i].bit_offset in the byte at process
            virtual memory address queryv[i].byte_addr
            is zero (0) THEN:
                stop the query and return FALSE; // K
                is not in the key set tracked by Bloom
                filter B.
        ENDFOR
        return TRUE from the Bloom query;
        DONE;
```

The pseudo code above assumes that the key-value set files are memory-mapped in full to a consecutive sequence of virtual memory addresses. If key-value set files are memory-mapped in part—for example only the portions of the file that contain the Bloom filter data are mapped—then memory offsets used in the above algorithm are adjusted to that situation.

The conditional nature of the fetch group technique is a distinguishing characteristic over other pre-fetching techniques that attempt to load file data from disk into cache in advance of when it is needed. Thus, these other techniques do not condition the loading of a well-defined collection of file pages if accessing one of them results in a page fault.

Although a key-value set file read under Linux is used in the examples above, none of these techniques are Linux-specific; all can be applied to any operating system that caches file pages and provides for memory-mapped files. Variations of file_check_fetch and mem_check_fetch can also be applied to other probabilistic filters for testing set membership. For example, these functions can be extended to a Counting Bloom filter—comprising an array of M f-bit counters and J different hash functions that each map a set element to one of the M counters—or to a Cuckoo hash table or a Cuckoo filter—comprising an array of M f-bit values (where the values are keys in the case of a Cuckoo hash table, and key fingerprints in the case of a Cuckoo filter) and two different hash functions that each map a set element to one of the M f-bit values. Mem_fetch_group can be applied to any data structure that is stored in a memory-mapped file in one or more known pages, and where it is beneficial to initiate an asynchronous load of the non-cached pages comprising the data structure when processing a page fault for any one of these pages. Hence mem_fetch_group can be beneficial to a wide range of applications, not just probabilistic filters for testing set membership.

Figure 5:
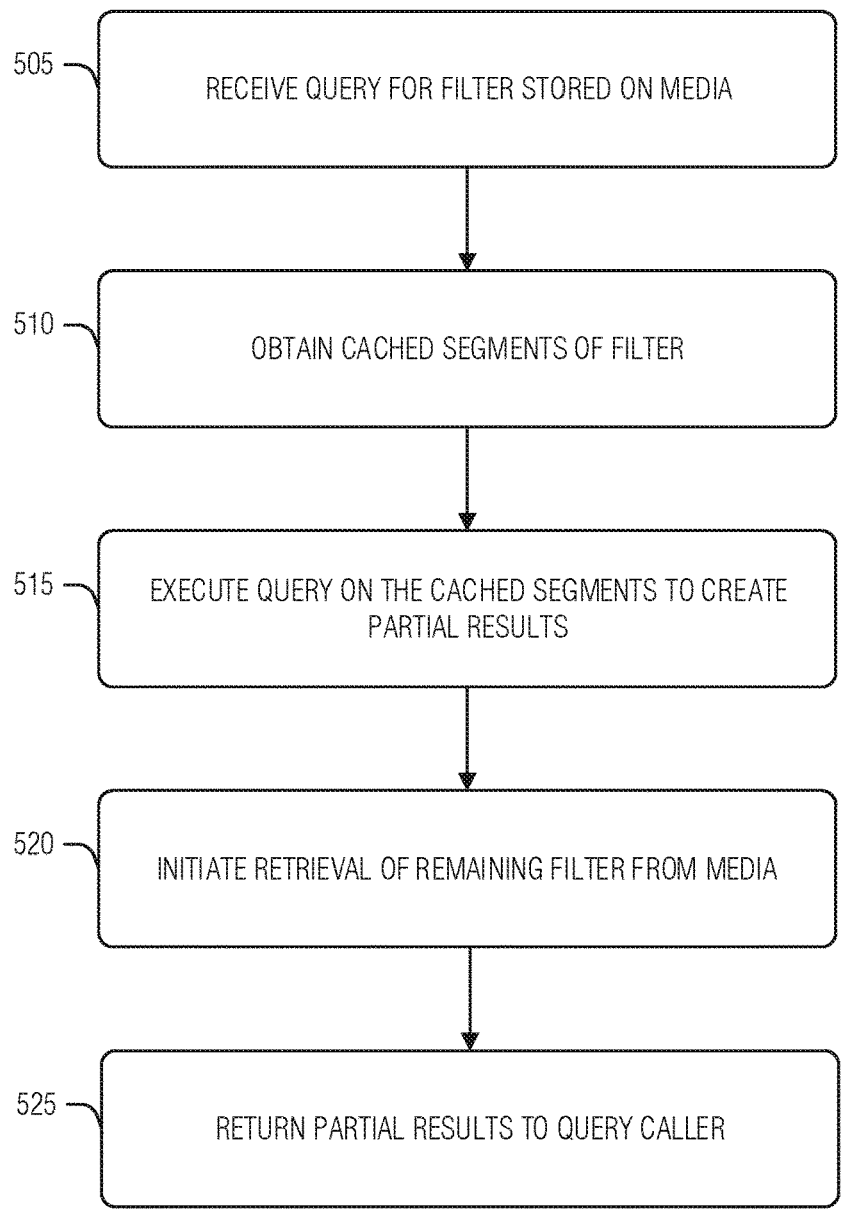
FIG. 5 is a flow diagram of an example of a method for reducing probabilistic filter query latency, according to an embodiment.

FIG. 5 is a flow diagram of an example of a method 500 for reducing probabilistic filter query latency, according to an embodiment. The operations of the method 500 are performed using computer hardware such as that described above or below.

At operation 505, a query for a probabilistic filter that is stored on a first media is received from a caller. In an example, receiving the query includes receiving segment identifiers. In an example, the segment identifiers specify which segments, of all segments of the probabilistic filter, are pertinent to the query. In an example, the segment identifiers are byte offsets in a file. In an example, the query includes a file identifier for the file.

In an example, the file is a key-value set file. In an example, the key-value set file includes key-value sets from more than one KVS tree. In an example, the probabilistic filter applies to a single KVS tree in the key-value set file.

In an example, a fetch group data structure is maintained for pages of the key-value set file. In this example, pages in the fetch group for the key-value set file are retrieved in response to a page fault on one page in the fetch group data structure.

In an example, the query includes a set of test parameters. In an example, the test parameters include a location (e.g., an index to a Bloom filter array, a bucket in a Cuckoo filter, address, etc.). In an example, the location is a bit offset in a segment. In an example, the subset of the test parameters includes a bit value in each location.

At operation 510, in response to receiving the query, cached segments of the probabilistic filter stored on a second media are obtained. In an example, the cached segments are less than all of the probabilistic filter stored on the first media. In an example, the probabilistic filter provides a set membership determination that is conclusive in a determination that an element is not in a set. In an example, the probabilistic filter is at least one of a Bloom filter, a Counting Bloom filter, or a Cuckoo filter.

In an example, receiving the query includes receiving segment identifiers. In an example, the segment identifiers specify which segments, of all segments of the probabilistic filter, are pertinent to the query. In an example, obtaining the cached segments includes obtaining segments of the probabilistic filter in the second media that correspond to the segment identifiers.

In an example, segments of the probabilistic filter are based on a representation of the probabilistic filter in the second media. In an example, the segments have a uniform size. In an example, the uniform size is a memory page size. In an example, the segment identifiers are memory page identifiers. In an example, the segment identifiers are memory addresses.

At operation 515, the query is executed on the cached segments resulting in a partial query result.

At operation 520, Retrieval of remaining data of the probabilistic filter from the first media to the second media is initiated (e.g., begun) without intervention from the caller. In an example, the remaining data corresponds to the query and data that is not in the cached segments. In an example, retrieval of remaining data of the probabilistic filter includes identifying a stop condition of the probabilistic filter in the partial query result and avoiding (e.g., aborting or taking no further action with respect to) the retrieval of the remaining data.

At operation 525, the partial query results are returned to the caller. In an example where the query includes test parameters, the partial query result includes results for a subset of the test parameters performed on the cached segments. In an example, the partial query results include a listing of segment identifiers that are pertinent to the query and not in the cached segments. In an example, the caller receives the partial query result, searches the subset of test parameters for a stop condition defined by the probabilistic filter, and searches for the stop condition within segments of the segment identifiers when the stop condition is not found in the subset of test parameters. Here, the segments are resident in the second media as a result of initiating the retrieval of the remaining data of the probabilistic filter.

Figure 6:
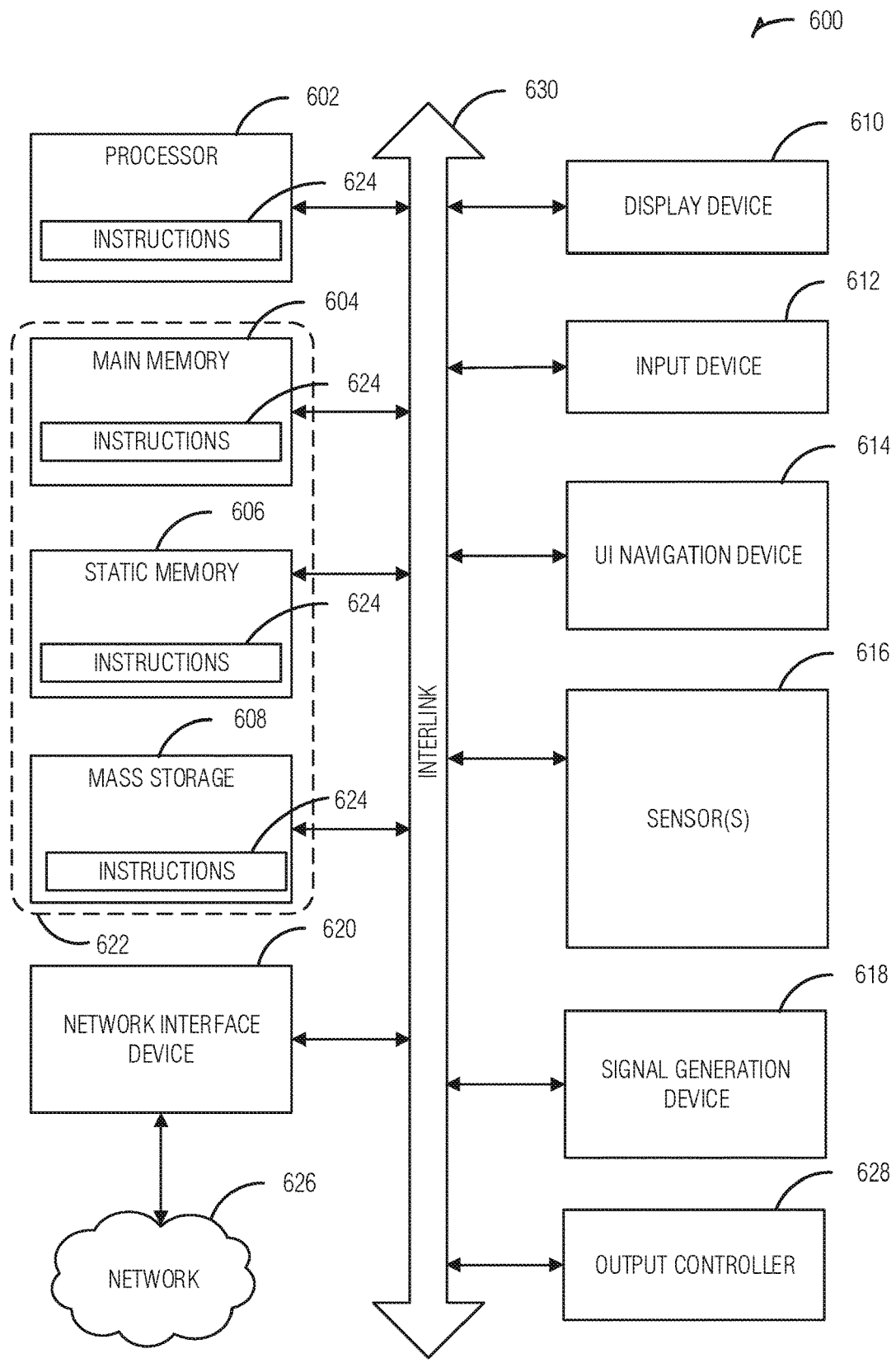
FIG. 6 is a block diagram illustrating an example of a machine upon which one or more embodiments can be implemented.

FIG. 6 illustrates a block diagram of an example machine 600 upon which any one or more of the techniques (e.g., methodologies) discussed herein can perform. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the min memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile devices, such as semiconductor memory devices (e.g., Electrically Programmable Read-Only Memory (EPROM), Electrically Erasable Programmable Read-Only Memory (EEPROM)), flash devices; magnetic disks, such as internal hard disks and removable disks; magneto-optical disks; and CD-ROM and DVD-ROM disks.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a system for reducing probabilistic filter query latency, the system comprising processing circuitry to: receive, from a caller, a query for a probabilistic filter that is stored on a first media; obtain, in response to receiving the query, cached segments of the probabilistic filter stored on a second media, wherein the cached segments are less than all of the probabilistic filter stored on the first media, wherein the probabilistic filter provides a set membership determination that is conclusive in a determination that an element is not in a set; execute the query on the cached segments resulting in a partial query result; initiate retrieval of remaining data of the probabilistic filter from the first media to the second media without intervention from the caller, wherein the remaining data corresponds to the query and data that is not in the cached segments; and return to the caller the partial query results.

In Example 2, the subject matter of Example 1 includes, wherein, to receive the query, the processing circuitry receives segment identifiers, the segment identifiers specifying which segments, of all segments of the probabilistic filter, are pertinent to the query.

In Example 3, the subject matter of Example 2 includes, wherein the segment identifiers are byte offsets in a file.

In Example 4, the subject matter of Example 3 includes, wherein the query includes a file identifier for the file.

In Example 5, the subject matter of Examples 3-4 includes, wherein the file is a key-value set file.

In Example 6, the subject matter of Example 5 includes, wherein the processing circuitry is further to: maintain a fetch group data structure for pages of the key-value set file; and retrieve pages in the fetch group for the key-value set file in response to a page fault on one page in the fetch group data structure.

In Example 7, the subject matter of Examples 5-6 includes, wherein the key-value set file includes more than one KVS tree.

In Example 8, the subject matter of Example 7 includes, wherein the probabilistic filter applies to a single KVS tree in the key-value set file.

In Example 9, the subject matter of Examples 2-8 includes, wherein, to obtain the cached segments, the processing circuitry obtains segments of the probabilistic filter in the second media that correspond to the segment identifiers.

In Example 10, the subject matter of Examples 1-9 includes, wherein segments of the probabilistic filter are based on a representation of the probabilistic filter in the second media.

In Example 11, the subject matter of Example 10 includes, wherein the segments have a uniform size.

In Example 12, the subject matter of Example 11 includes, wherein the uniform size is a memory page size.

In Example 13, the subject matter of Example 12 includes, wherein the segment identifiers are page identifiers.

In Example 14, the subject matter of Examples 11-13 includes, wherein the segment identifiers are memory addresses.

In Example 15, the subject matter of Examples 1-14 includes, wherein the query includes a set of test parameters, and wherein the partial query result includes results for a subset of the test parameters performed on the cached segments.

In Example 16, the subject matter of Example 15 includes, wherein the test parameters include a location.

In Example 17, the subject matter of Example 16 includes, wherein the location is a bit offset in a segment.

In Example 18, the subject matter of Example 17 includes, wherein the subset of the test parameters includes a bit value in each location.

In Example 19, the subject matter of Examples 15-18 includes, wherein the partial query results include a listing of segment identifiers that are pertinent to the query and not in the cached segments.

In Example 20, the subject matter of Example 19 includes, wherein the processing circuitry is further to: receive, by the caller, the partial query result; search the subset of test parameters in the partial query result for a stop condition defined by the probabilistic filter; and search for the stop condition within segments of the segment identifiers when the stop condition is not found in the subset of test parameters, the segments being resident in the second media as a result of initiating the retrieval of the remaining data of the probabilistic filter.

In Example 21, the subject matter of Examples 1-20 includes, wherein, to initiate retrieval of remaining data of the probabilistic filter, the processing circuitry identifies a stop condition of the probabilistic filter in the partial query result and abandons the retrieval of the remaining data.

In Example 22, the subject matter of Examples 1-21 includes, wherein the probabilistic filter is at least one of a Bloom filter, a Counting Bloom filter, or a Cuckoo filter.

Example 23 is a method for reducing probabilistic filter query latency, the method comprising: receiving, from a caller, a query for a probabilistic filter that is stored on a first media; obtaining, in response to receiving the query, cached segments of the probabilistic filter stored on a second media, wherein the cached segments are less than all of the probabilistic filter stored on the first media, wherein the probabilistic filter provides a set membership determination that is conclusive in a determination that an element is not in a set; executing the query on the cached segments resulting in a partial query result; initiating retrieval of remaining data of the probabilistic filter from the first media to the second media without intervention from the caller, wherein the remaining data corresponds to the query and data that is not in the cached segments; and returning to the caller the partial query results.

In Example 24, the subject matter of Example 23 includes, wherein receiving the query includes receiving segment identifiers, the segment identifiers specifying which segments, of all segments of the probabilistic filter, are pertinent to the query.

In Example 25, the subject matter of Example 24 includes, wherein the segment identifiers are byte offsets in a file.

In Example 26, the subject matter of Example 25 includes, wherein the query includes a file identifier for the file.

In Example 27, the subject matter of Examples 25-26 includes, wherein the file is a key-value set file.

In Example 28, the subject matter of Example 27 includes, maintaining a fetch group data structure for pages of the key-value set file; and retrieving pages in the fetch group for the key-value set file in response to a page fault on one page in the fetch group data structure.

In Example 29, the subject matter of Examples 27-28 includes, wherein the key-value set file includes more than one KVS tree.

In Example 30, the subject matter of Example 29 includes, wherein the probabilistic filter applies to a single KVS tree in the key-value set file.

In Example 31, the subject matter of Examples 24-30 includes, wherein obtaining the cached segments includes obtaining segments of the probabilistic filter in the second media that correspond to the segment identifiers.

In Example 32, the subject matter of Examples 23-31 includes, wherein segments of the probabilistic filter are based on a representation of the probabilistic filter in the second media.

In Example 33, the subject matter of Example 32 includes, wherein the segments have a uniform size.

In Example 34, the subject matter of Example 33 includes, wherein the uniform size is a memory page size.

In Example 35, the subject matter of Example 34 includes, wherein the segment identifiers are page identifiers.

In Example 36, the subject matter of Examples 33-35 includes, wherein the segment identifiers are memory addresses.

In Example 37, the subject matter of Examples 23-36 includes, wherein the query includes a set of test parameters, and wherein the partial query result includes results for a subset of the test parameters performed on the cached segments.

In Example 38, the subject matter of Example 37 includes, wherein the test parameters include a location.

In Example 39, the subject matter of Example 38 includes, wherein the location is a bit offset in a segment.

In Example 40, the subject matter of Example 39 includes, wherein the subset of the test parameters includes a bit value in each location.

In Example 41, the subject matter of Examples 37-40 includes, wherein the partial query results include a listing of segment identifiers that are pertinent to the query and not in the cached segments.

In Example 42, the subject matter of Example 41 includes, receiving, by the caller, the partial query result; searching the subset of test parameters in the partial query result for a stop condition defined by the probabilistic filter; and searching for the stop condition within segments of the segment identifiers when the stop condition is not found in the subset of test parameters, the segments being resident in the second media as a result of initiating the retrieval of the remaining data of the probabilistic filter.

In Example 43, the subject matter of Examples 23-42 includes, wherein initiating retrieval of remaining data of the probabilistic filter includes identifying a stop condition of the probabilistic filter in the partial query result and abandoning the retrieval of the remaining data.

In Example 44, the subject matter of Examples 23-43 includes, wherein the probabilistic filter is at least one of a Bloom filter, a Counting Bloom filter, or a Cuckoo filter.

Example 45 is a machine readable medium including instructions that, when executed by a machine, cause the machine to perform any method of Examples 23-44.

Example 46 is a system comprising means to perform any method of Examples 23-44.

Example 47 is a machine readable medium including instructions for reducing probabilistic filter query latency, the instructions, when executed by processing circuitry, cause the processing circuitry to perform operations comprising: receiving, from a caller, a query for a probabilistic filter that is stored on a first media; obtaining, in response to receiving the query, cached segments of the probabilistic filter stored on a second media, wherein the cached segments are less than all of the probabilistic filter stored on the first media, wherein the probabilistic filter provides a set membership determination that is conclusive in a determination that an element is not in a set; executing the query on the cached segments resulting in a partial query result; initiating retrieval of remaining data of the probabilistic filter from the first media to the second media without intervention from the caller, wherein the remaining data corresponds to the query and data that is not in the cached segments; and returning to the caller the partial query results.

In Example 48, the subject matter of Example 47 includes, wherein receiving the query includes receiving segment identifiers, the segment identifiers specifying which segments, of all segments of the probabilistic filter, are pertinent to the query.

In Example 49, the subject matter of Example 48 includes, wherein the segment identifiers are byte offsets in a file.

In Example 50, the subject matter of Example 49 includes, wherein the query includes a file identifier for the file.

In Example 51, the subject matter of Examples 49-50 includes, wherein the file is a key-value set file.

In Example 52, the subject matter of Example 51 includes, wherein the operations comprise: maintaining a fetch group data structure for pages of the key-value set file; and retrieving pages in the fetch group for the key-value set file in response to a page fault on one page in the fetch group data structure.

In Example 53, the subject matter of Examples 51-52 includes, wherein the key-value set file includes more than one KVS tree.

In Example 54, the subject matter of Example 53 includes, wherein the probabilistic filter applies to a single KVS tree in the key-value set file.

In Example 55, the subject matter of Examples 48-54 includes, wherein obtaining the cached segments includes obtaining segments of the probabilistic filter in the second media that correspond to the segment identifiers.

In Example 56, the subject matter of Examples 47-55 includes, wherein segments of the probabilistic filter are based on a representation of the probabilistic filter in the second media.

In Example 57, the subject matter of Example 56 includes, wherein the segments have a uniform size.

In Example 58, the subject matter of Example 57 includes, wherein the uniform size is a memory page size.

In Example 59, the subject matter of Example 58 includes, wherein the segment identifiers are page identifiers.

In Example 60, the subject matter of Examples 57-59 includes, wherein the segment identifiers are memory addresses.

In Example 61, the subject matter of Examples 47-60 includes, wherein the query includes a set of test parameters, and wherein the partial query result includes results for a subset of the test parameters performed on the cached segments.

In Example 62, the subject matter of Example 61 includes, wherein the test parameters include a location.

In Example 63, the subject matter of Example 62 includes, wherein the location is a hit offset in a segment.

In Example 64, the subject matter of Example 63 includes, wherein the subset of the test parameters includes a bit value in each location.

In Example 65, the subject matter of Examples 61-64 includes, wherein the partial query results include a listing of segment identifiers that are pertinent to the query and not in the cached segments.

In Example 66, the subject matter of Example 65 includes, wherein the operations comprise: receiving, by the caller, the partial query result; searching the subset of test parameters in the partial query result for a stop condition defined by the probabilistic filter; and searching for the stop condition within segments of the segment identifiers when the stop condition is not found in the subset of test parameters, the segments being resident in the second media as a result of initiating the retrieval of the remaining data of the probabilistic filter.

In Example 67, the subject matter of Examples 47-66 includes, wherein initiating retrieval of remaining data of the probabilistic filter includes identifying a stop condition of the probabilistic filter in the partial query result and abandoning the retrieval of the remaining data.

In Example 68, the subject matter of Examples 47-67 includes, wherein the probabilistic filter is at least one of a Bloom filter, a Counting Bloom filter, or a Cuckoo filter.

Example 69 is a system for reducing probabilistic filter query latency, the system comprising: means for receiving, from a caller, a query for a probabilistic filter that is stored on a first media; means for obtaining, in response to receiving the query, cached segments of the probabilistic filter stored on a second media, wherein the cached segments are less than all of the probabilistic filter stored on the first media, wherein the probabilistic filter provides a set membership determination that is conclusive in a determination that an element is not in a set; means for executing the query on the cached segments resulting in a partial query result; means for initiating retrieval of remaining data of the probabilistic filter from the first media to the second media without intervention from the caller, wherein the remaining data corresponds to the query and data that is not in the cached segments; and means for returning to the caller the partial query results.

In Example 70, the subject matter of Example 69 includes, wherein the means for receiving the query include means for receiving segment identifiers, the segment identifiers specifying which segments, of all segments of the probabilistic filter, are pertinent to the query.

In Example 71, the subject matter of Example 70 includes, wherein the segment identifiers are byte offsets in a file.

In Example 72, the subject matter of Example 71 includes, wherein the query includes a file identifier for the file.

In Example 73, the subject matter of Examples 71-72 includes, wherein the file is a key-value set file.

In Example 74, the subject matter of Example 73 includes, means for maintaining a fetch group data structure for pages of the key-value set file; and means for retrieving pages in the fetch group for the key-value set file in response to a page fault on one page in the fetch group data structure.

In Example 75, the subject matter of Examples 73-74 includes, wherein the key-value set file includes more than one KVS tree.

In Example 76, the subject matter of Example 75 includes, wherein the probabilistic filter applies to a single KVS tree in the key-value set file.

In Example 77, the subject matter of Examples 70-76 includes, wherein the means for obtaining the cached segments include means for obtaining segments of the probabilistic filter in the second media that correspond to the segment identifiers.

In Example 78, the subject matter of Examples 69-77 includes, wherein segments of the probabilistic filter are based on a representation of the probabilistic filter in the second media.

In Example 79, the subject matter of Example 78 includes, wherein the segments have a uniform size.

In Example 80, the subject matter of Example 79 includes, wherein the uniform size is a memory page size.

In Example 81, the subject matter of Example 80 includes, wherein the segment identifiers are page identifiers.

In Example 82, the subject matter of Examples 79-81 includes, wherein the segment identifiers are memory addresses.

In Example 83, the subject matter of Examples 69-82 includes, wherein the query includes a set of test parameters, and wherein the partial query result includes results for a subset of the test parameters performed on the cached segments.

In Example 84, the subject matter of Example 83 includes, wherein the test parameters include a location.

In Example 85, the subject matter of Example 84 includes, wherein the location is a bit offset in a segment.

In Example 86, the subject matter of Example 85 includes, wherein the subset of the test parameters includes a bit value in each location.

In Example 87, the subject matter of Examples 83-86 includes, wherein the partial query results include a listing of segment identifiers that are pertinent to the query and not in the cached segments.

In Example 88, the subject matter of Example 87 includes, means for receiving, by the caller, the partial query result; means for searching the subset of test parameters in the partial query result for a stop condition defined by the probabilistic filter; and means for searching for the stop condition within segments of the segment identifiers when the stop condition is not found in the subset of test parameters, the segments being resident in the second media as a result of initiating the retrieval of the remaining data of the probabilistic filter.

In Example 89, the subject matter of Examples 69-88 includes, wherein the means for initiating retrieval of remaining data of the probabilistic filter include means for identifying a stop condition of the probabilistic filter in the partial query result and abandoning the retrieval of the remaining data.

In Example 90, the subject matter of Examples 69-89 includes, wherein the probabilistic filter is at least one of a Bloom filter, a Counting Bloom filter, or a Cuckoo filter.

Example 91 is a system for reducing probabilistic filter query latency, the system comprising processing circuitry to: receive notification of a page fault, the page vault being a request for a memory page corresponding to a memory mapped file, the memory page not being in memory; determine that the memory page is part of a fetch group; and initiate a load of memory pages in the fetch group that are not in memory.

In Example 92, the subject matter of Example 91 includes, wherein, to initiate the load, the processing circuitry performs an asynchronous load of the memory pages in the fetch group that are not in memory.

In Example 93, the subject matter of Examples 91-92 includes, wherein, to determine that the memory page is part of a fetch group, the processing circuitry finds the memory page in a fetch group data structure.

In Example 94, the subject matter of Example 93 includes, wherein the data structure is a table.

In Example 95, the subject matter of Example 94 includes, wherein the table holds more than one fetch group.

In Example 96, the subject matter of Examples 93-95 includes, wherein the processing circuitry is further to: receive identification of pages in a fetch group; and store the identification into the data structure.

Example 97 is a method for reducing probabilistic filter query latency, the method comprising: receiving notification of a page fault, the page vault being a request for a memory page corresponding to a memory mapped file, the memory page not being in memory; determining that the memory page is part of a fetch group; and initiating a load of memory pages in the fetch group that are not in memory.

In Example 98, the subject matter of Example 97 includes, wherein initiating the load includes performing an asynchronous load of the memory pages in the fetch group that are not in memory.

In Example 99, the subject matter of Examples 97-98 includes, wherein determining that the memory page is part of a fetch group includes finding the memory page in a fetch group data structure.

In Example 100, the subject matter of Example 99 includes, wherein the data structure is a table.

In Example 101, the subject matter of Example 100 includes, wherein the table holds more than one fetch group.

In Example 102, the subject matter of Examples 99-101 includes, receiving identification of pages in a fetch group; and storing the identification into the data structure.

Example 103 is a machine readable medium including instructions for reducing probabilistic filter query latency, the instructions, when executed by a processing circuitry, causing the processing circuitry to perform operations comprising: receiving notification of a page fault, the page vault being a request for a memory page corresponding to a memory mapped file, the memory page not being in memory; determining that the memory page is part of a fetch group; and initiating a load of memory pages in the fetch group that are not in memory.

In Example 104, the subject matter of Example 103 includes, wherein initiating the load includes performing an asynchronous load of the memory pages in the fetch group that are not in memory.

In Example 105, the subject matter of Examples 103-104 includes, wherein determining that the memory page is part of a fetch group includes finding the memory page in a fetch group data structure.

In Example 106, the subject matter of Example 105 includes, wherein the data structure is a table.

In Example 107, the subject matter of Example 106 includes, wherein the table holds more than one fetch group.

In Example 108, the subject matter of Examples 105-107 includes, wherein the operations comprise: receiving identification of pages in a fetch group; and storing the identification into the data structure.

Example 109 is a system for reducing probabilistic filter query latency, the system comprising: means for receiving notification of a page fault, the page vault being a request for a memory page corresponding to a memory mapped file, the memory page not being in memory; means for determining that the memory page is part of a fetch group; and means for initiating a load of memory pages in the fetch group that are not in memory.

In Example 110, the subject matter of Example 109 includes, wherein the means for initiating the load include means for performing an asynchronous load of the memory pages in the fetch group that are not in memory.

In Example 111, the subject matter of Examples 109-110 includes, wherein the means for determining that the memory page is part of a fetch group include means for finding the memory page in a fetch group data structure.

In Example 112, the subject matter of Example 111 includes, wherein the data structure is a table.

In Example 113, the subject matter of Example 112 includes, wherein the table holds more than one fetch group.

In Example 114, the subject matter of Examples 111-113 includes, means for receiving identification of pages in a fetch group; and means for storing the identification into the data structure.

Example 115 is at least one machine-readable medium including instructions that, when executed by processing circuitry, cause the processing circuitry to perform operations to implement of any of Examples 1-114.

Example 116 is an apparatus comprising means to implement of any of Examples 1-114.

Example 117 is a system to implement of any of Examples 1-114.

Example 118 is a method to implement of any of Examples 1-114.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system comprising processing circuitry to perform operations comprising:
   receiving, from a calling software application, a query for a probabilistic filter that is stored on a first media;
   obtaining, in response to receiving the query, cached segments of the probabilistic filter stored on a second media, the cached segments being less than all of the probabilistic filter stored on the first media, the probabilistic filter providing a set membership determination that is conclusive in a determination that an element is not in a set;
   executing the query on the cached segments resulting in a partial query result;
   initiating retrieval of remaining data of the probabilistic filter from the first media to the second media without intervention from the calling software application, the initiating retrieval of remaining data of the probabilistic filter comprising identifying a stop condition of the probabilistic filter in the partial query result and abandoning the retrieval of the remaining data, the remaining data corresponding to the query and data that is not in the cached segments; and
   returning to the calling software application the partial query results.

2. The system of claim 1, wherein receiving the query comprises receiving one or more segment identifiers that specify which segments of the probabilistic filter are pertinent to the query.

3. The system of claim 2, wherein the one or more segment identifiers are byte offsets in a file.

4. The system of claim 3, wherein the file comprises a key-value set file.

5. The system of claim 4, wherein the operations further comprise:
   maintaining a data structure for a fetch group for pages of the key-value set file; and
   retrieving pages in the fetch group for the key-value set file in response to a page fault on at least one page in the data structure.

6. The system of claim 1, wherein the partial query results comprise a listing of segment identifiers that are pertinent to the query and not in the cached segments.

7. The system of claim 1, wherein the probabilistic filter comprises at least one of a Bloom filter, a Counting Bloom filter, or a Cuckoo filter.

8. A method comprising:
- receiving, from a calling software application, a query for a probabilistic filter that is stored on a first media, the query comprising a set of test parameters;
- obtaining, in response to receiving the query, cached segments of the probabilistic filter stored on a second media, the cached segments being less than all of the probabilistic filter stored on the first media, the probabilistic filter providing a set membership determination that is conclusive in a determination that an element is not in a set;
- executing the query on the cached segments resulting in a partial query result, the partial query result comprising results for a subset of the test parameters performed on the cached segments;
- initiating retrieval of remaining data of the probabilistic filter from the first media to the second media without intervention from the calling software application, the remaining data corresponding to the query and data that is not in the cached segments; and
- returning to the calling software application the partial query results.

9. The method of claim 8, wherein receiving the query comprises receiving one or more segment identifiers that specify which segments of the probabilistic filter are pertinent to the query.

10. The method of claim 9, wherein the one or more segment identifiers are byte offsets in a file.

11. The method of claim 10, wherein the file comprises a key-value set file.

12. The method of claim 11, further comprising:
- maintaining a data structure for a fetch group for pages of the key-value set file; and
- retrieving pages in the fetch group for the key-value set file in response to a page fault on at least one page in the data structure.

13. The method of claim 8, wherein the partial query results comprise a listing of segment identifiers that are pertinent to the query and not in the cached segments.

14. The method of claim 8, wherein the probabilistic filter comprises at least one of a Bloom filter, a Counting Bloom filter, or a Cuckoo filter.

15. A non-transitory machine readable storage medium comprising instructions, the instructions, when executed by processing circuitry, causing the processing circuitry to perform operations comprising:
- receiving, from a calling software application, a query for a probabilistic filter that is stored on a first media, the query comprising a set of test parameters;
- obtaining, in response to receiving the query, cached segments of the probabilistic filter stored on a second media, the cached segments being less than all of the probabilistic filter stored on the first media, the probabilistic filter providing a set membership determination that is conclusive in a determination that an element is not in a set;
- executing the query on the cached segments resulting in a partial query result, the partial query result comprising results for a subset of the test parameters performed on the cached segments;
- initiating retrieval of remaining data of the probabilistic filter from the first media to the second media without intervention from the calling software application, the remaining data corresponding to the query and data that is not in the cached segments; and
- returning to the calling software application the partial query results.

16. The machine readable medium of claim 15, wherein the cached segments have a uniform size.

17. The machine readable medium of claim 16, wherein the uniform size is a memory page size.

18. The machine readable medium of claim 17, wherein receiving the query comprises receiving one or more segment identifiers that specify which segments of the probabilistic filter are pertinent to the query, the one or more segment identifiers being page identifiers.

19. The machine readable medium of claim 18, wherein the one or more segment identifiers comprise memory addresses.

20. The machine readable medium of claim 15, wherein the partial query results comprise a listing of segment identifiers that are pertinent to the query and not in the cached segments.

* * * * *